United States Patent
Jayaram et al.

(10) Patent No.: US 12,477,449 B2
(45) Date of Patent: Nov. 18, 2025

(54) RADIO ACCESS TECHNOLOGY MANAGEMENT FOR WIRELESS COMMUNICATIONS OF MULTI-SUBSCRIBER-IDENTIFICATION-MODULE (MSIM) LOW LATENCY HOTSPOT DEVICES

(71) Applicant: Apple Inc., Cupertino, CA (US)

(72) Inventors: Bharath Jayaram, San Jose, CA (US); Ajoy K Singh, Milpitas, CA (US); Vijay Gadde, San Jose, CA (US); Sharad Garg, Cupertino, CA (US); Vijay Venkataraman, San Jose, CA (US); Sandeep K Sunkesala, San Jose, CA (US); Sanjeevi Balasubramanian, San Jose, CA (US); Vijendrakumar K Ashiwal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 17/830,194

(22) Filed: Jun. 1, 2022

(65) Prior Publication Data
US 2023/0397095 A1    Dec. 7, 2023

(51) Int. Cl.
*H04W 48/18* (2009.01)
*H04W 8/18* (2009.01)
*H04W 24/08* (2009.01)

(52) U.S. Cl.
CPC ............ *H04W 48/18* (2013.01); *H04W 8/18* (2013.01); *H04W 24/08* (2013.01)

(58) Field of Classification Search
CPC ....... H04W 48/18; H04W 8/18; H04W 24/08; H04W 88/06; H04W 24/02; H04W 76/15; H04W 28/0268
(Continued)

(56) References Cited

U.S. PATENT DOCUMENTS 9,167,484 B2 * 10/2015 Joul ............... H04W 36/00224
11,115,872 B2 * 9/2021 Dowlatkhah ......... H04W 76/10
(Continued)

FOREIGN PATENT DOCUMENTS

| EP | 2670175 | 12/2013 | |
| GB | 2413460 A * | 10/2005 | .......... H04M 1/6066 |

(Continued)

OTHER PUBLICATIONS

International Search Report for PCT/US2023/023642; Jul. 31, 2023.

*Primary Examiner* — Mong-Thuy T Tran
(74) *Attorney, Agent, or Firm* — Kowert, Hood, Munyon, Rankin & Goetzel, P.C.

(57) ABSTRACT

A device executing a low-latency application that uses a Wi-Fi link may switch from the Wi-Fi link to using a second link to a multi-subscriber (MSIM) PHS device. The device may access, via the second link, any one of multiple cellular links, each cellular link corresponding to a different respective cellular subscription of multiple subscriptions used by the PHS device. The application executing on the device may thus use a preferred cellular link from among the multiple cellular links. The preferred cellular link may be determined based on parameters corresponding to the plurality of cellular links for each respective cellular subscription. The parameters may be obtained from a location database. The preferred cellular link (which may presently correspond to a primary subscription) on the PHS device may be switched to be a different cellular link (which may correspond to a non-primary subscription) during execution of the application on the device.

15 Claims, 9 Drawing Sheets

(58) Field of Classification Search
USPC .......................................................... 370/329
See application file for complete search history.

(56) References Cited

U.S. PATENT DOCUMENTS

| | | |
|---|---|---|
| 2002/0154632 A1 | 10/2002 | Wang et al. |
| 2010/0311402 A1 | 12/2010 | Srinivasan et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2014/0038601 A1 | 2/2014 | Gouriou et al. |
| 2014/0044099 A1 | 2/2014 | Sfar |
| 2014/0323112 A1 | 10/2014 | Wu |
| 2016/0234749 A1* | 8/2016 | Singh .................. H04W 36/302 |
| 2017/0164277 A1 | 6/2017 | Anyuru |
| 2017/0230870 A1 | 8/2017 | Shi et al. |
| 2017/0280380 A1 | 9/2017 | Gundu et al. |
| 2019/0141137 A1* | 5/2019 | Verger .................. H04W 76/23 |
| 2019/0320322 A1* | 10/2019 | Jayawardene ........ H04L 5/0007 |
| 2020/0028900 A1* | 1/2020 | Rice .................... H04L 67/1042 |
| 2021/0360742 A1* | 11/2021 | Liao ...................... H04W 60/00 |
| 2022/0007171 A1* | 1/2022 | Wang .................... H04W 76/15 |
| 2022/0286994 A1* | 9/2022 | Singh .................... H04W 24/04 |
| 2022/0294847 A1* | 9/2022 | Rice ........................ H04W 4/50 |
| 2023/0129344 A1* | 4/2023 | Mueller ............... H04B 7/0691 |
| | | 455/450 |
| 2024/0056372 A1* | 2/2024 | VanDuyn ............ H04L 41/5025 |

FOREIGN PATENT DOCUMENTS

| | | | | |
|---|---|---|---|---|
| TW | 201801552 A | * | 1/2018 | ........... H04B 17/318 |
| WO | 2013183028 | | 12/2013 | |

* cited by examiner

RADIO ACCESS TECHNOLOGY MANAGEMENT FOR WIRELESS COMMUNICATIONS OF MULTI-SUBSCRIBER-IDENTIFICATION-MODULE (MSIM) LOW LATENCY HOTSPOT DEVICES

FIELD OF THE INVENTION

The present application relates to wireless communications, including radio access technology (RAT) management for wireless communications of Multi-Subscriber-Identification-Module (MSIM) low latency hotspot devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A current telecommunications standard moving beyond previous standards is called 5th generation mobile networks or 5th generation wireless systems, referred to as 3GPP NR (otherwise known as 5G-NR or NR-5G for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of wireless communication systems, including NR cellular wireless communications, is the operation of certain mobile devices as personal hotspot (PHS) devices used by other devices to access cellular links of the PHS device for use by certain applications running on the other mobile devices. Some PHS devices may be multiple-subscriber or multi-subscriber (MSIM) devices. Currently, switching between the different subscriptions on an MSIM device is extremely limited, especially when the MSIM device is used as a PHS device. Improvements are therefore desired.

SUMMARY OF THE INVENTION

Embodiments are presented herein of, inter alia, of methods and procedures for improved radio access technology (RAT) management for wireless communications of Multi-Subscriber-Identification-Module (MSIM) low latency hotspot devices. Embodiments are further presented herein for wireless communication systems containing at least wireless communication devices or user equipment devices (UEs) and/or base stations and/or access points (APs) communicating with each other within the wireless communication systems.

First Exemplary Embodiments

In some embodiments, a device may determine the link quality of a Wi-Fi link used by the device for an application session executing on the device. The device may also perform an evaluation of the link performance of multiple cellular links corresponding to respective cellular subscriptions used by a second device (e.g., a device that may be available to the device as a personal hotspot (PHS) device.) The device may switch to using a second link established between the device and the second device (e.g., a low-latency PHS link between the device and the second device used as a PHS by the device) to access a selected cellular link of the multiple cellular links for use by the device via the second device for the application session, based on the determination indicating that the link quality of the Wi-Fi link does not satisfy a set of link performance requirements and the evaluation indicating that the device should switch from using the Wi-Fi link to using the second link. Alternatively, the device may continue using the Wi-Fi link in response to either the determination indicating that the Wi-Fi link satisfies the set of link performance requirements, or the determination indicating that the Wi-Fi link does not satisfy the set of link performance requirements and the evaluation indicating that the device should not switch from using the Wi-Fi link to using the second link.

In some embodiments, the device may be a wearable device such as a smart watch or smart goggles, for example. The selected cellular link may be determined based at least on the link quality of the multiple cellular links. The device may obtain parameters corresponding to the multiple cellular links for each respective cellular subscription from a location database, and perform the evaluation using the obtained parameters. The first subscription of the respective cellular subscriptions may be a primary subscription (or dedicated data service, DDS, subscription) and remaining subscriptions of the respective cellular subscriptions may be non-primary subscriptions (or non-DDS subscriptions.) In some embodiments, the selected cellular link may be determined based at least on whether a dedicated bearer is supported on any of the non-primary. The selected cellular link may be determined further based on whether the dedicated bearer is supported on the primary subscription, when the dedicated bearer is supported on at least one of the non-primary subscriptions. The selected cellular link may correspond to the primary subscription when the dedicated bearer is supported on the primary subscription. Alternatively, the selected cellular link may correspond to a non-primary subscription when the dedicated bearer is supported on the non-primary subscription and is not supported on the primary subscription.

Second Exemplary Embodiments

In some embodiments, a device may include radio circuitry that enables wireless communications of the device, and may further include a processor coupled to the radio circuitry and interoperating with the radio circuitry to have the device conduct cellular communications over an active cellular link. The active cellular link may be a first cellular link of multiple cellular links with each cellular link corresponding to a respective cellular subscription of multiple cellular subscriptions used by the device. The device may operate as a PHS and thus also establish a link with a second device. The established link (e.g., a PHS link) may allow the second device to access the active cellular link via the device for an application session executing on the second device. The device may make a determination of a link quality of the first cellular link, perform an evaluation of the link performance of the multiple cellular links, and switch to a second cellular link as the active cellular link, based on the determination indicating that the link quality of the first cellular link does not satisfy a set of link performance requirements and the evaluation indicating that the first cellular link should no longer be the active cellular link. The device may switch to the second cellular link further based on determining that cellular switching is enabled on the device.

In some embodiments, the device may continue using the first cellular link as the active cellular link in response to the determination indicating that the first cellular link satisfies the set of link performance requirements, or the determination indicating that the link quality of the first cellular link does not satisfy the set of link performance requirements and the evaluation indicating that the first cellular link should remain the active cellular link.

The device may obtain parameters corresponding to the multiple cellular links for each respective cellular subscription from a location database, and perform the evaluation using the parameters. In some embodiments, the first cellular link may correspond to a primary subscription of the cellular subscriptions and the second cellular link may correspond to a non-primary cellular subscription of the cellular subscriptions.

Exemplary Method Embodiments

A method for efficient communications using a personal hotspot (PHS) device may include executing an application on a device, which may include using a Wi-Fi link for the application, making a determination of a link quality of the Wi-Fi link, performing an evaluation of the link performance of cellular links corresponding to respective cellular subscriptions used by the PHS device. The method may further include switching to using a second link established between the device and the PHS device to access an active cellular link of the cellular links for use by the device via the PHS device for the application. The switching may be performed in response to the determination indicating that the link quality of the Wi-Fi link does not satisfy a set of link performance requirements and the evaluation indicating that the device should switch from using the Wi-Fi link to using the second link. The method may also include alternatively continuing to use the Wi-Fi link either in response to the determination indicating that the Wi-Fi link satisfies the set of link performance requirements, or in response to the determination indicating that the Wi-Fi link does not satisfy the set of link performance requirements and the evaluation indicating that the device should not switch from using the Wi-Fi link to using the second link.

The method may further include determining the active cellular link based at least on the link quality of the cellular links, and in some cases additionally based on which cellular links of the plurality of cellular links support a dedicated bearer. Performing the evaluation may include obtaining parameters corresponding to the cellular links for each respective cellular subscription from a location database, and performing the evaluation based on the parameters. Finally, the method may include making a determination whether to switch to a second cellular link to become the active cellular link on the PHS device during execution of the application on the device, and switching to the second cellular link to become the active cellular link in response to the determination indicating that the second cellular link should be the active cellular link. The determination may be based at least on the link performance of the cellular links.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
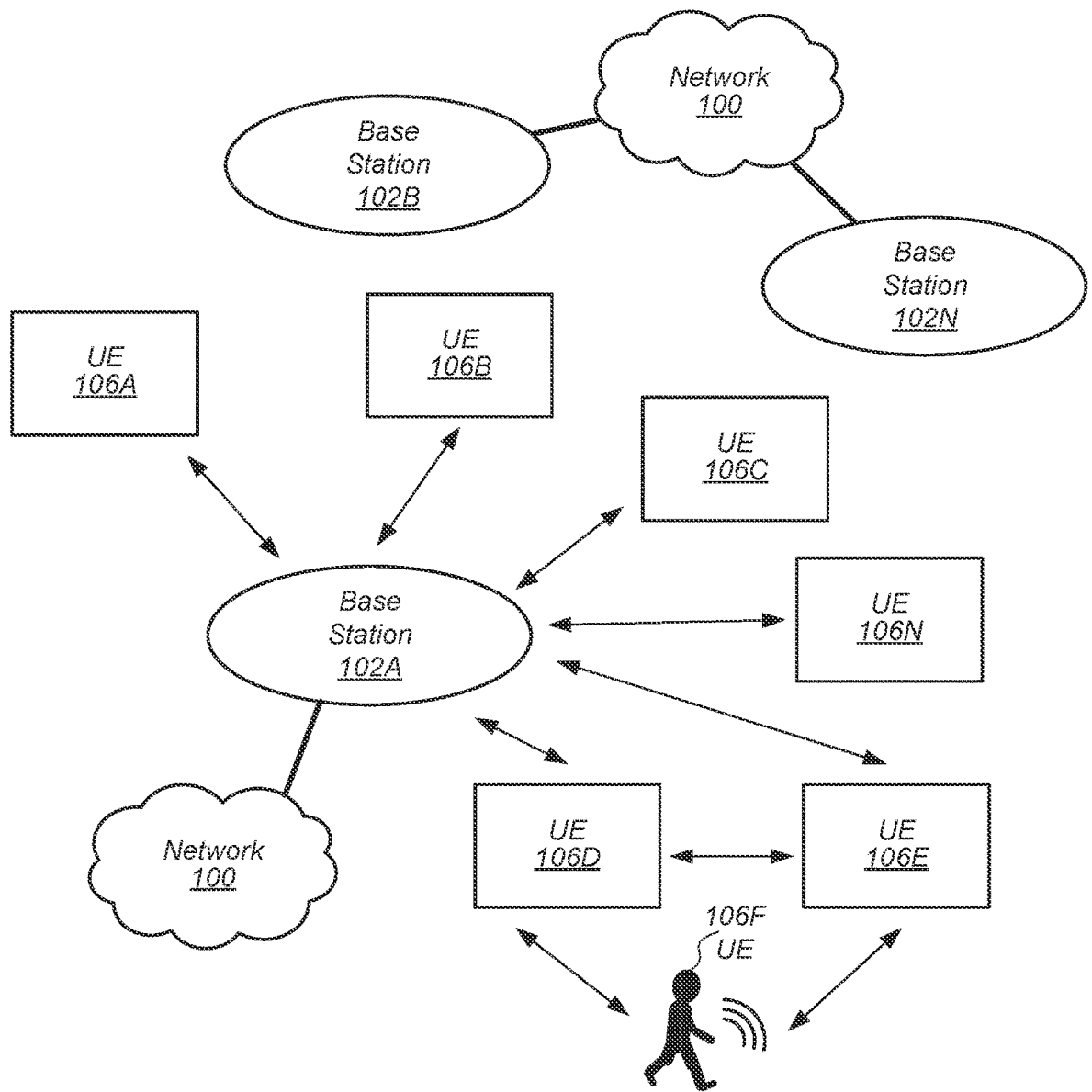
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

5GMM: 5G Mobility Management
AF: Application Function
AMF: Access and Mobility Management Function
AMR: Adaptive Multi-Rate AP: Access Point
APN: Access Point Name
APR: Applications Processor
BS: Base Station
BSSID: Basic Service Set Identifier
CBG: Code Block Group
CBRS: Citizens Broadband Radio Service
CBSD: Citizens Broadband Radio Service Device
CCA: Clear Channel Assessment
CMR: Change Mode Request
CORESET: Control Resource Set
CS: Circuit Switched
CSI: Channel State Information
DCI: Downlink Control Information
DDS: Dedicated Data Service
DL: Downlink (from BS to UE)
DMRS: Demodulation Reference Signal
DN: Data Network
DSDS: Dual SIM Dual Standby
DYN: Dynamic
EDCF: Enhanced Distributed Coordination Function
eSNPN: Equivalent Standalone Non-Public Network
ETSI: European Telecommunications Standards Institute
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IC: In Coverage
IMS: Internet Protocol Multimedia Subsystem
IOT: Internet of Things
IP: Internet Protocol
ITS: Intelligent Transportation Systems
LAN: Local Area Network
LBT: Listen Before Talk
LCS: Location Services
LMF: Location Management Function
LPP: LTE Positioning Protocol
LQM: Link Quality Metric
LTE: Long Term Evolution
MCC: Mobile Country Code
MCS: Modulation and Coding Scheme
MNO: Mobile Network Operator
MO-LR: Mobile Originated Location Request
MSIM: Multiple Subscriber Identification Module(s)
MT-LR: Mobile-Terminated Location Request
NAS: Non-Access Stratum
NDI: New Data Indicator
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
OOC: Out Of Coverage
PAL: Priority Access Licensee
PDCP: Packet Data Convergence Protocol
PDN: Packet Data Network
PDU: Protocol Data Unit
PGW: PDN Gateway
PLMN: Public Land Mobile Network
ProSe: Proximity Services
PRS: Positioning Reference Signal
PSCCH: Physical Sidelink Control Channel
PSFCH: Physical Sidelink Feedback Channel
PSSCH: Physical Sidelink Shared Channel
PSD: Power Spectral Density
PSS: Primary Synchronization Signal
PT: Payload Type
PTRS: Phase Tracking Reference Signal
PUCCH: Physical Uplink Control Channel
QBSS: Quality of Service Enhanced Basic Service Set
QCI: Quality of Class Identifier
QI: Quality Indicator
RA: Registration Accept
RAT: Radio Access Technology
RF: Radio Frequency
RNTI: Radio Network Temporary Identifier
ROHC: Robust Header Compression
RR: Registration Request
RRC: Radio Resource Control
RS: Reference Signal
RSRP: Reference Signal Receive Power
RTP: Real-time Transport Protocol
RV: Redundancy Version
RX: Reception/Receive
SAS: Spectrum Allocation Server
SD: Slice Descriptor
SI: System Information
SIB: System Information Block
SID: System Identification Number
SIM: Subscriber Identification Module
SGW: Serving Gateway
SMF: Session Management Function
SNPN: Standalone Non-Public Network
SRS: Sounding Reference Signal
SSS: Secondary Synchronization Signal
SUPI: Subscription Permanent Identifier
TBS: Transport Block Size
TCP: Transmission Control Protocol
TDD: Time Division Duplexing
TDRA: Time Domain Resource Allocation
TPC: Transmit Power Control
TX: Transmission/Transmit
UAC: Unified Access Control
UDM: Unified Data Management
UDR: User Data Repository
UE: User Equipment
UI: User Input
UL: Uplink (from UE to BS)
UMTS: Universal Mobile Telecommunication System
UPF: User Plane Function
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN
ZP: Zero Power Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™ Microsoft XBox™, etc.), portable gaming devices (e.g., Nintendo DS™, PlayStation Portable™, Gameboy Advance™, iPod™), laptops, wearable devices (e.g. smart watch, smart glasses), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation. For example, in 5G NR, the operating frequency bands are categorized in two groups. More specifically, per 3GPP Release 15, frequency bands are designated for different frequency ranges (FR) and are defined as FR1 and FR2, with FR1 encompassing the 410 MHz-7125 MHz range and FR2 encompassing the 24250 MHz-52600 MHz range.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Downlink Control Information (DCI)—In 3GPP communications, DCI is transmitted to a mobile device or UE (e.g., by a serving base station in the network) and contains multiple different fields. Each field is used to configure one part or aspect of a scheduled communication(s) of the device. To put it another way, each field in the DCI may correspond to a specific communication parameter or parameters configuring a corresponding aspect of the scheduled communication(s) of the device. By decoding the DCI, the UE obtains all the configuring parameters or parameter values according to the fields in the DCI, thereby obtaining all the information about the scheduled communication(s) and subsequently performing the scheduled communication(s) according to those parameters/parameter values.

Subscriber Identification Module (SIM)—In wireless communications (e.g., 3GPP communications), a SIM is used to securely store the international mobile subscriber identity (IMSI) number and its related key, which are used to identify and authenticate subscribers on mobile devices (such as mobile phones, computers, satellite phones, smart watches, cameras, smart tablets, etc.) The SIM is implemented as an integrated circuit (IC), typically on a removable physical card, or in the form of a programmable memory element inside the mobile device. A SIM typically contains a unique serial number (ICCID), international mobile subscriber identity (IMSI) number, security authentication and ciphering information, temporary information related to the local network, a list of the services accessible to the user, a personal identification number (PIN) for ordinary use, and a personal unblocking key (PUK) for unlocking the PIN. Oftentimes devices may be provisioned with more than one SIM (or SIM card) for operating according to more than one service subscription. Such devices are referred to as multiple SIM (MSIM) devices. MSIM devices usually have a designated primary subscriber line on which cellular data communications are conducted. This may be referred to as the dedicated data service (DDS) subscription/subscriber line (or DDS sub) of the MSIM device. The data service(s) corresponding to the other SIM (s)/subscription(s) may be referred to as non-DDS sub(s).

Personal Hotspot—Mobile devices may have the capability of sharing their cellular link(s)—meaning communication over the cellular link(s)—and/or internet connection with other connected devices. Such mobile devices may be linked to the other devices via one of many different links, for example via a wireless local area network (Wi-Fi), over Bluetooth or via a cabled connection such as USB, just to name a few. A device that wirelessly shares its cellular link(s) and/or internet connection with other devices is oftentimes referred to as a personal hotspot (PHS; or mobile hotspot), which effectively enables the device to operate as a portable router. Personal hotspots may be protected by a PIN or password, and an Internet-connected and/or cellular capable mobile device may thereby serve as a portable wireless access point and router for other devices that are connected to it.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
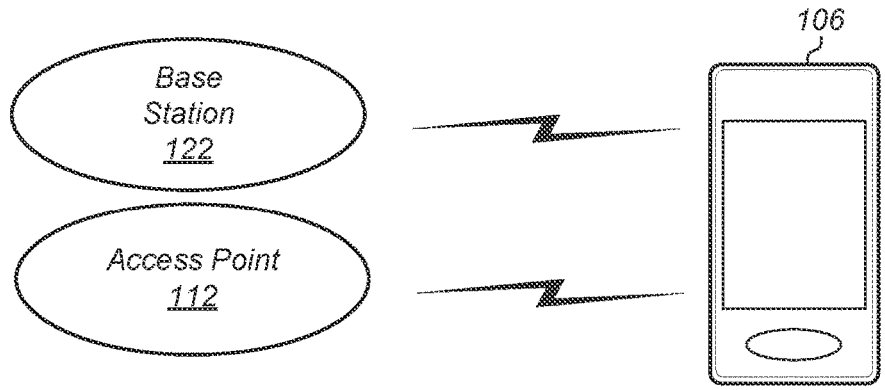
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or eNB'. Similarly, if the base station 102A is implemented in the context of 5G NR, it may alternately be referred to as 'gNodeB' or 'gNB'. In some embodiments, the base station 102 (e.g. an eNB in an LTE network or a gNB in an NR network) may communicate with at least one UE having the capability to transmit reference signals according to various embodiments disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various embodiments of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNS S. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and separate radios for communicating using each of Wi-Fi and BLUETOOTH™. Other configurations are also possible.

Figure 3:
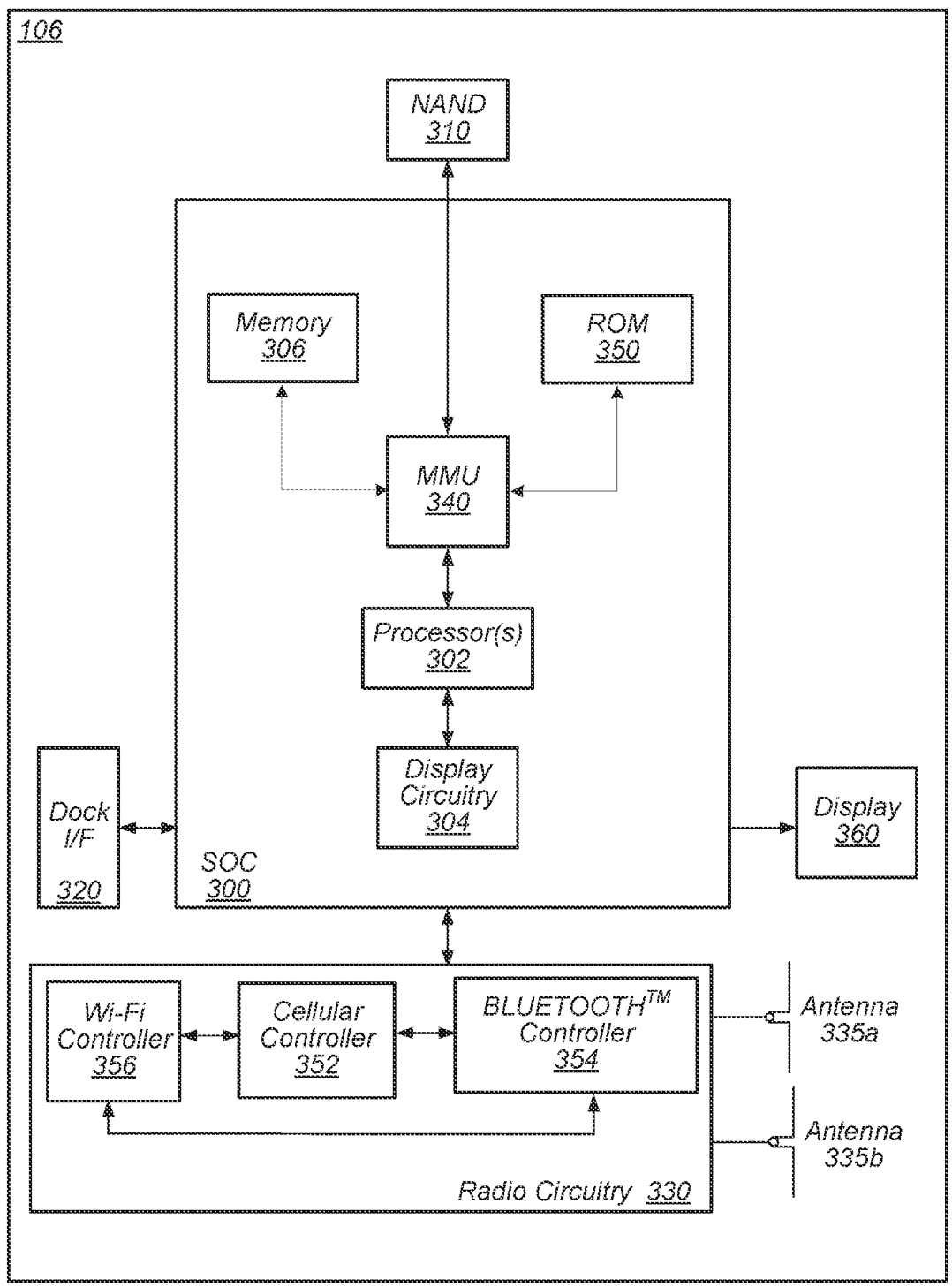
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to transmit reference signals according to various embodiments disclosed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 to transmit reference signals according to various embodiments disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

Figure 5:
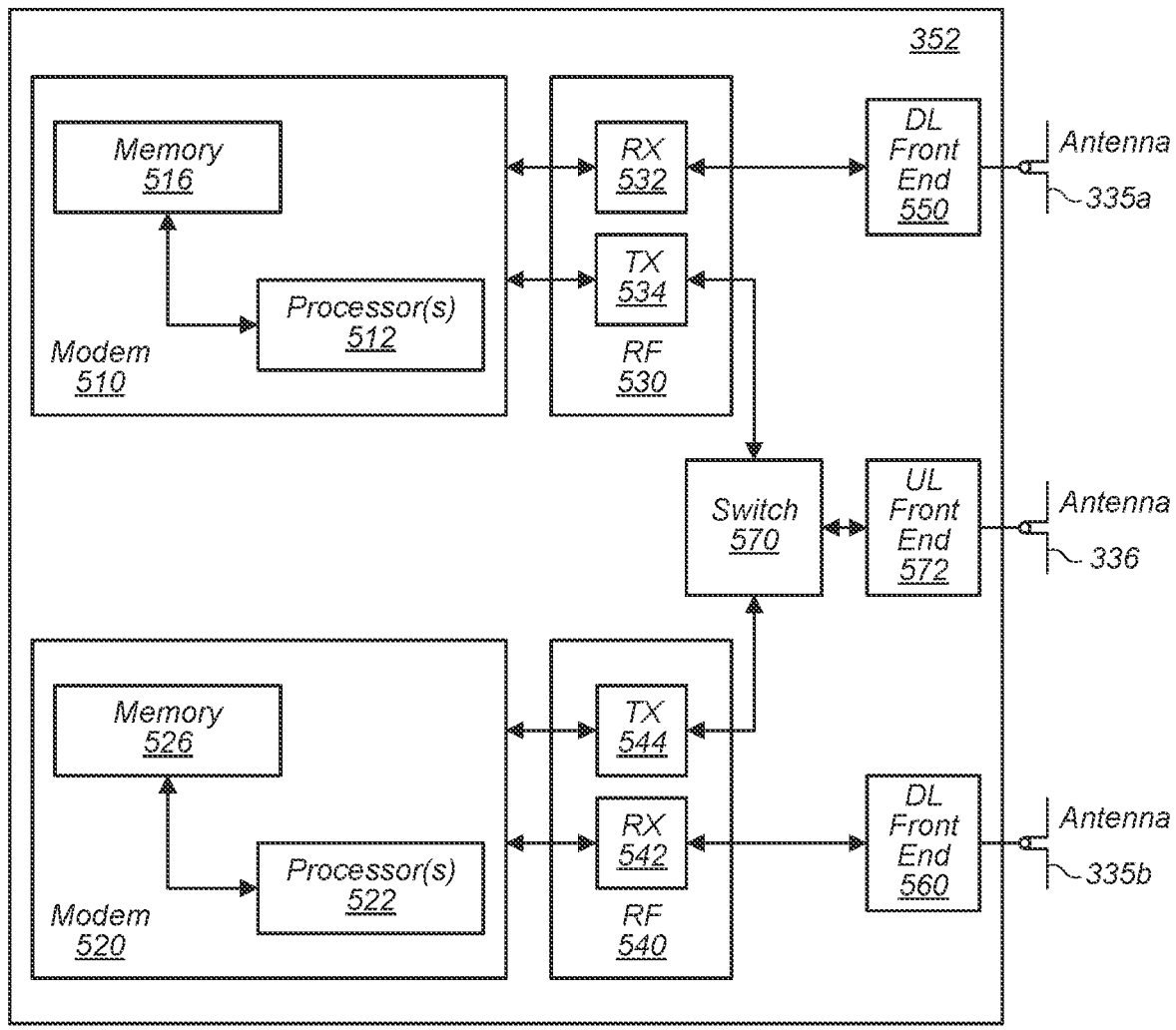
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH™ controller 354, and according to at least some embodiments, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
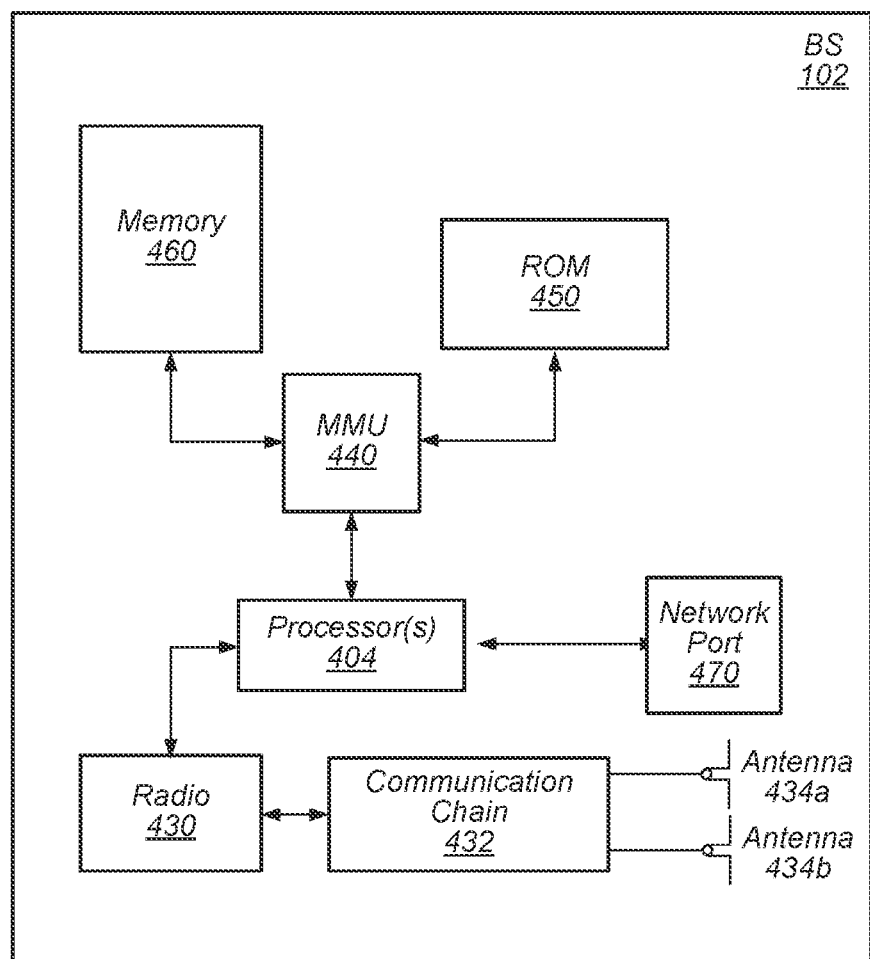
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium). Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5GNR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
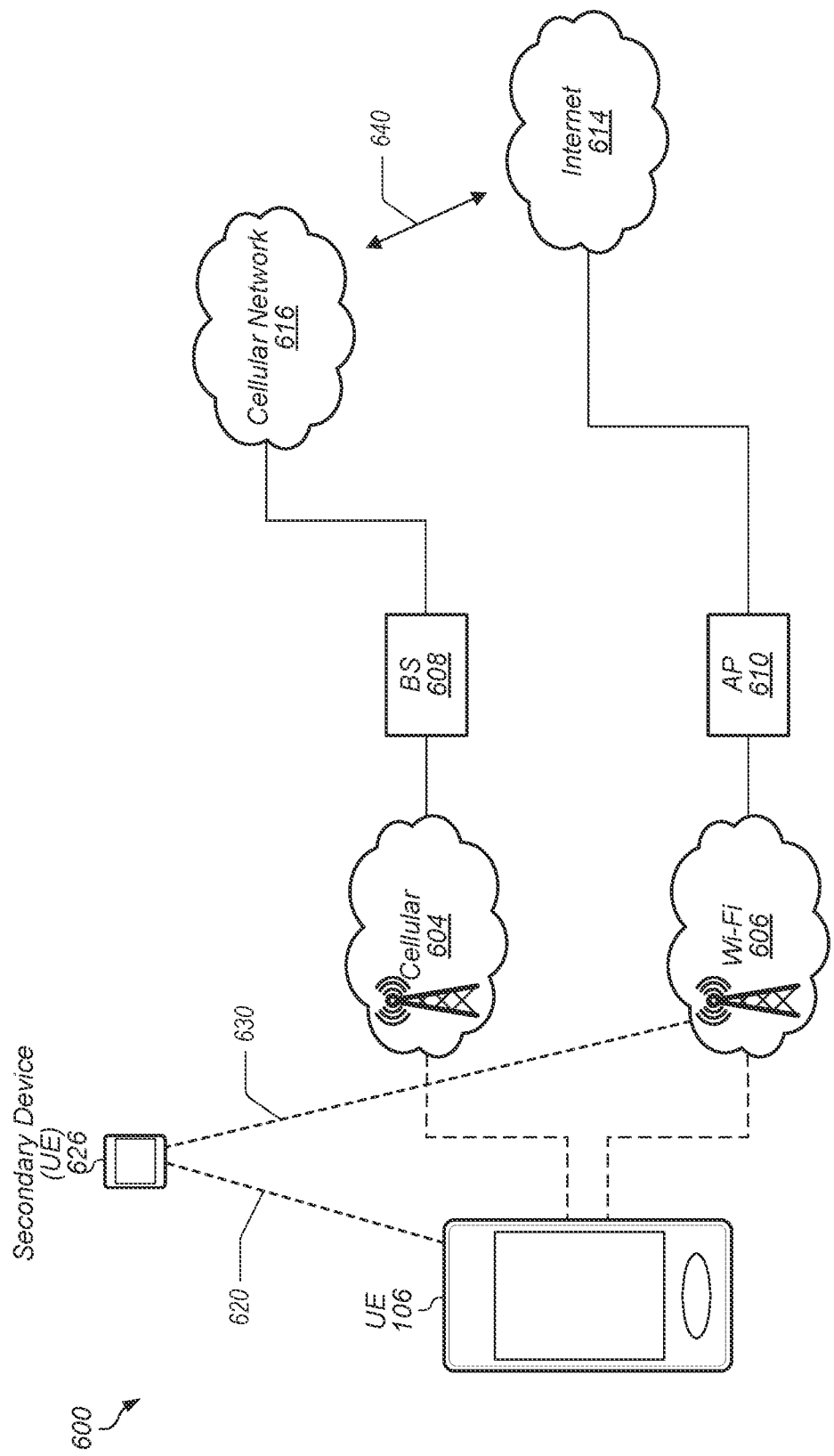
FIG. 6 shows illustrates an exemplary wireless communication system that includes a secondary device in communication with a primary device, according to some embodiments.

FIG. 6—Exemplary Multi-RAT Communication System

FIG. 6 illustrates an exemplary wireless communication system 600 in accordance with some embodiments. System 600 is a system in which both a cellular access network and a Wi-Fi radio access network are implemented. The system 600 may include UE 106, a secondary mobile/wireless device 626, cellular access network 604, and Wi-Fi access network 606.

Cellular access network 604 is representative of some embodiments of a first RAT access and Wi-Fi access network 606 is representative of some embodiments of a second RAT access. Cellular access network 604 may be interfaced with a broader cellular network (e.g., cellular NR-5G network 616) and Wi-Fi access network 606 may be interfaced with the Internet 614. More particularly, cellular access network 604 may be interfaced with a serving base station (BS) 608, which may in turn provide access to broader cellular network 616. The Wi-Fi access network 606 may be interfaced with an access point (AP) 610, which may in turn provide access to the Internet 614. UE 106 may accordingly access Internet 614 via AP 610 and may access cellular network 616 via cellular access network 604.

In some embodiments, UE 106 may also access Internet 614 via cellular access network 604. More specifically, cellular access network 604 may be interfaced with a serving gateway, which may in turn be interfaced with a packet data network (PDN) gateway, which may in turn be interfaced with Internet 614, as illustrated by the link 640 between cellular network 616 and Internet 614. Additionally, UE 106 may also serve as a personal hotspot to secondary device 626 as indicated by communication link 620 between UE 106 and secondary device 626, enabling secondary device 626 to communicate over cellular access network 604 via UE 106. In some embodiments, secondary device 626 may establish link 620 (which may be a low-latency link) with UE 106 and access Internet 614 via UE 106 in such a manner. For example, secondary device 626 may be executing/running an application, such as voice call communications over Internet Protocol (VoIP call), and the application/call may be conducted by device 626 via link 620 and UE 106. Alternately, secondary device 626 may also access Internet 614 via Wi-Fi access network 606 as indicated by communication link 630 from secondary device 626 to Wi-Fi access network 606. In some embodiments, secondary device 626 may be a wearable device such as a smart watch, for example. Secondary device 626 may also be in communication with UE 106 via one or more additional links, e.g., additional wireless links, in addition to communication link 620.

Accordingly, UE 106 may conduct various communications, e.g., data transfers or audio voice calls, via either or both of cellular access network 604 and Wi-Fi access network 606, while secondary device 626 may conduct various communications via Wi-Fi access network 606, or via cellular access network 604 through communication link 620 and UE 106 operating as a personal hotspot.

Figure 7:
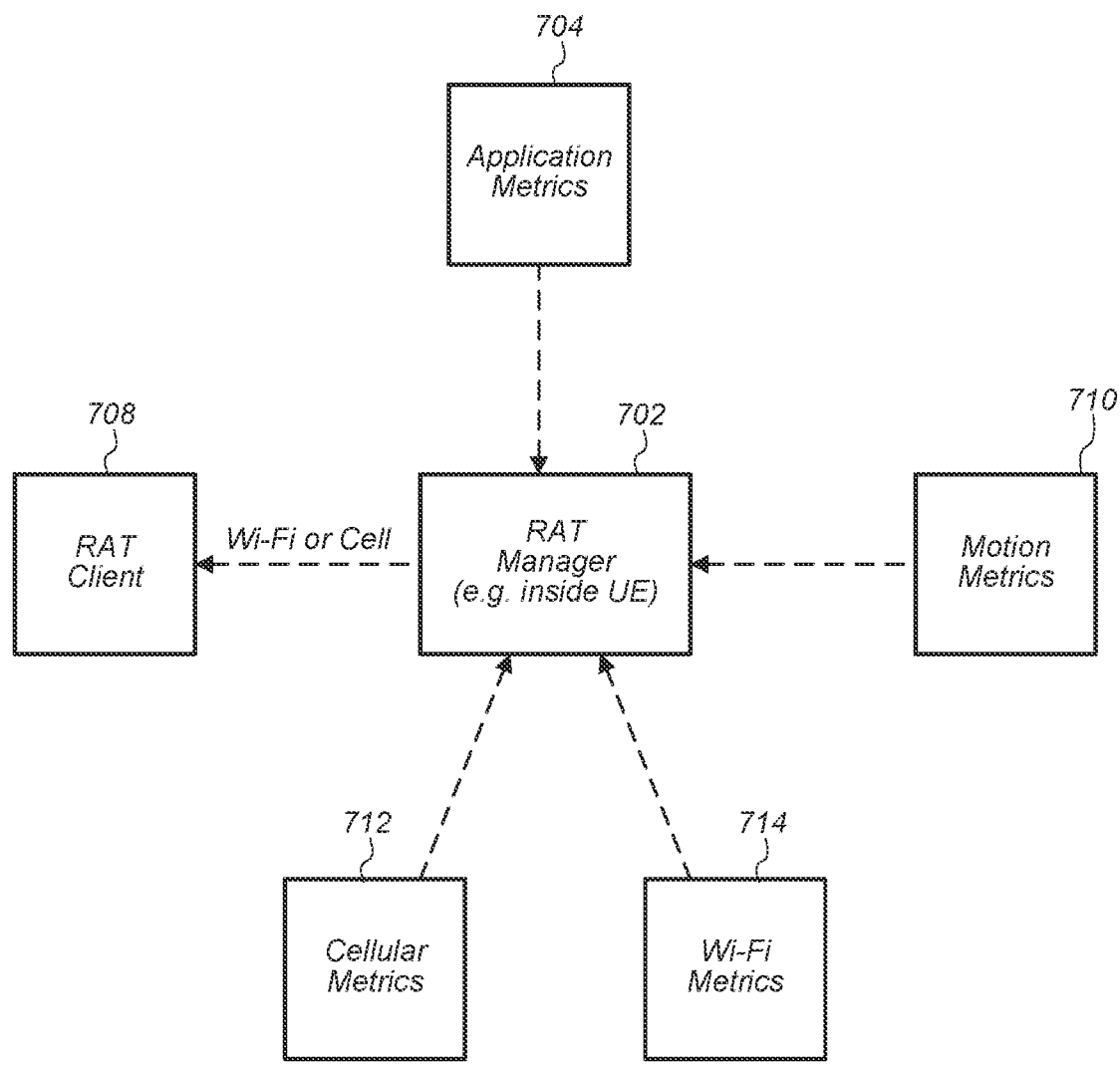
FIG. 7 shows a block diagram of an exemplary radio access technology selection manager.

FIG. 7—Radio Access Technology (Selection) Management

Various embodiments disclosed herein may include wireless communication devices dynamically determining when to use Wi-Fi communications versus cellular communications by using various metrics, e.g., Wi-Fi link quality metrics (LQMs) and cellular metrics, database parameters, and the like. A RAT manager (or RAT management algorithm) may use cross layer metrics to evaluate Wi-Fi versus cellular links for telephony voice and data use-cases. For example, a RAT manager in a UE may use Wi-Fi metrics, cellular metrics, application (e.g., RTP) metrics, transport metrics, and/or motion metrics. FIG. 7 provides an illustration of an exemplary RAT selection manager 702. As shown in FIG. 7, RAT manager 702 may determine whether RAT client 708 ought to conduct Wi-Fi communications or cellular communications. RAT manager 702 may use application metrics 704, motion metrics 710, Wi-Fi metrics 714 and/or cellular metrics 712 to determine which of Wi-Fi and cellular technologies to instruct the RAT client to use. The RAT client 708 may represent a UE or an application executing on the UE, or any entity with the capability of communicating according to Wi-Fi and cellular technologies.

Additionally, in case of MSIM devices, e.g., when RAT client 708 is associated with an MSIM device, RAT selection manager 702 may also determine which subscription may be used by RAT client 708 to conduct cellular communications.

For example, RAT manager 702 may determine whether RAT client 708 is to conduct cellular communications on a first subscription/subscriber line (e.g., a DDS subscription) or on a second subscription/subscriber line (e.g., a non-DDS subscription.) In some embodiments, switching between different subscriptions may be enabled and disabled on an MSIM device, for example by a user or through some other means.

Dynamic Link Switching

In most current devices, RAT managers can dynamically switch between a Wi-Fi link and a cellular link on DDS subscription only. That is, when switching from a Wi-Fi link to a cellular link, the cellular link is on the DDS subscription/line only, even in MSIM devices. The switching is usually based on Wi-Fi link quality metrics (LQMs) and cellular link metrics. Therefore, while a RAT manager may instruct a device to switch from Wi-Fi to cellular communications, those cellular communications are only on the DDS subscription/subscriber line in MSIM devices.

Referring again to FIG. 6, UE 106 may be running/executing an application, e.g., running a latency sensitive application session, over a Wi-Fi link, e.g., via Wi-Fi access network 606. When the Wi Fi link degrades, UE 106 may switch to cellular communications, e.g., UE 106 may switch the application session to communicate via cellular access network 604, based on various Wi-Fi LQMs and cellular metrics.

Figure 8:
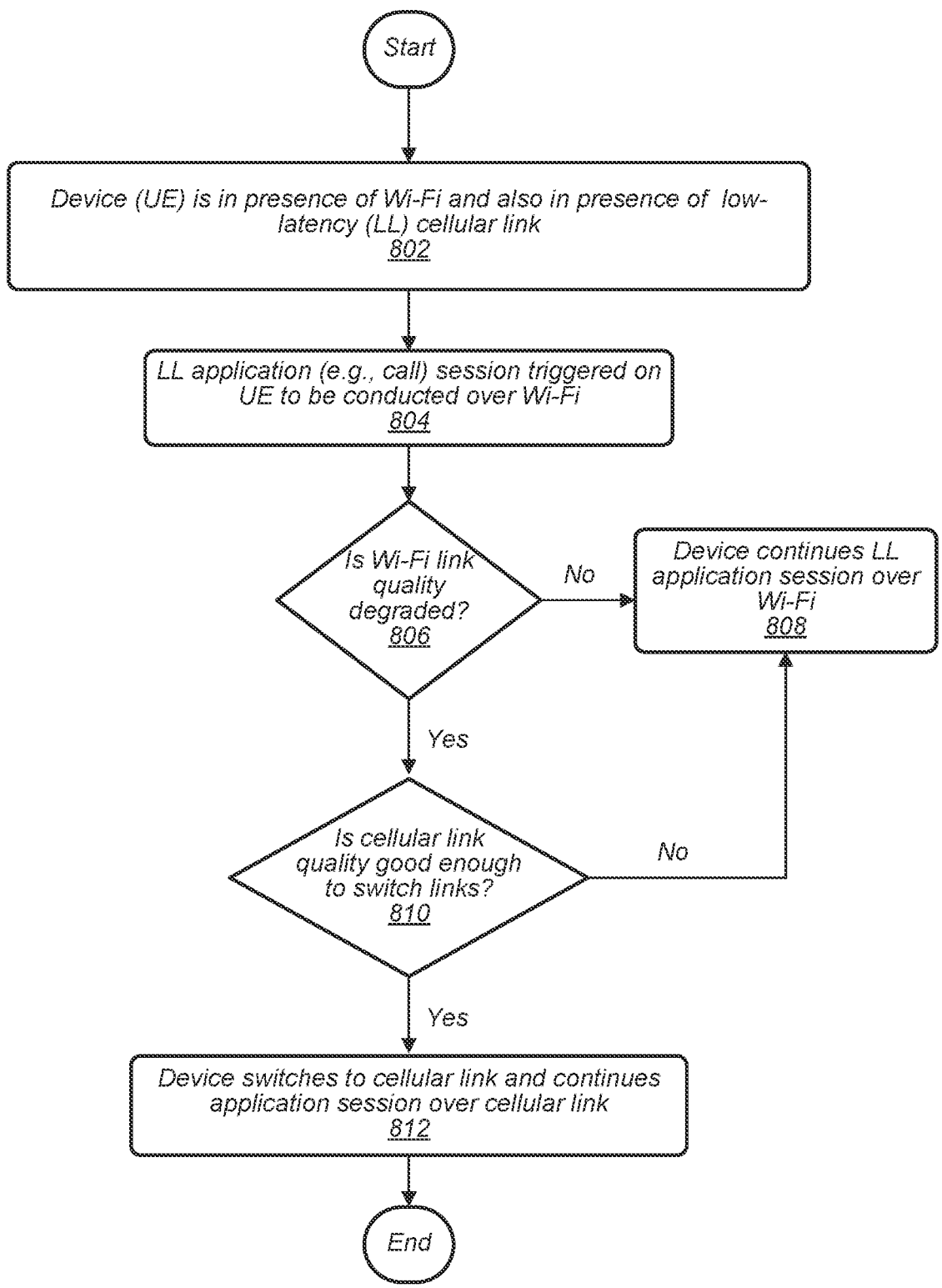
FIG. 8 shows an exemplary flow diagram illustrating a communication device switching links between different radio access technologies, according to prior art.

The above operation is illustrated in the exemplary flow diagram of FIG. 8. A device (UE) may be in presence of Wi-Fi and may also be in presence of a low-latency (LL) cellular link (802). At some point, an LL application (e.g., a call) session may be triggered on the UE to be conducted over Wi-Fi (804). If the Wi-Fi link is not degraded ("No" at 806), the device continues the LL application session over Wi-Fi (808). However, if the Wi-Fi link is degraded ("Yes" at 806) and the cellular link quality is good enough to switch communications from Wi-Fi ("Yes" at 810), the device may switch to the cellular link and continue the LL application session via the cellular link (812). If the cellular link quality for the PHS device is not good enough ("No" at 810), the device continues the LL application session over Wi-Fi (808). As noted above, in this case the determination of when a Wi-Fi link quality is degraded and when a cellular link is good enough may be based on Wi-Fi LQM and cellular link metrics, e.g., RSRP, SNR, RSRQ, etc.)

The process exemplified in FIG. 8 allows for dynamic switching from a Wi-Fi link or Wi-Fi communications to cellular link but with certain limitations. For example, data traffic on an MSIM device defaults to the DDS subscription/subscriber line (DDS sub, for short). Currently, switching on such MSIM devices between DDS sub and non-DDS sub during active application sessions is not supported. For example, when an MSIM device operates as a PHS (device), cellular data communications of the PHS MSIM device are conducted on the primary sub (or DDS sub) of the PHS MSIM device, and switching to another sub (e.g., a secondary sub or non-DDS sub) is not supported. This may present an issue in scenarios where:

both Wi-Fi and cellular links are degraded and the application session (e.g., call) continues on the Wi-Fi link until the application session drops; and/or
cellular link performance on the DDS sub is degraded due to various factors such as loading, block error rate (BLER) or low bandwidth being configured/supported on a particular site, even though the cellular link metrics meet designated criteria.

For a device supporting an MSIM configuration (or an MSIM device, for short), the DDS sub may be on an inferior RAT and may have worse RF conditions when compared to the non-DDS sub. In such cases if a UE switches to a DDS sub, the user experience provided by the DDS sub might not be optimum, for example it might not meet certain requirements, such as QoS requirements or other requirements for a given application. Therefore, considering the different parameters on the DDS sub and non-DDS sub(s) before switching to cellular communications or to a cellular link (e.g., from Wi-Fi communications or from a Wi-Fi link), and switching to the cellular link which best meets the link requirements for a given application (session) would help improve communications and the user experience.

Use of Location Database (DB) Parameters to Optimize Sub and RAT Selection

The decision-making process for dynamic switching between Wi-Fi and cellular links may utilize a database that stores pertinent wireless link performance indicators. In some embodiments, this may be a location database (DB), which is a crowdsourcing database that stores multiple key performance indicators (KPIs) as reported by various different devices from given locations within given time periods. The database may be periodically updated with new data, for example it may be updated daily. KPIs in the database are stored for all subs, not only a primary sub (or DDS sub.) Evaluation of location DB parameters on all data subs (DDS and non-DDS subs) may be optimal for a RAT manager to determine whether to switch to/from cellular communications, and more specifically, which sub to use for cellular communications. That is, instead of defaulting to the DDS sub (or primary sub) cellular link, metrics may be evaluated for all subs, and link switching may thereby be open to switching to any one of the subs for cellular communications. In some embodiments, the switching decision may be based by evaluating any one or more of the following parameters for all subs of an MSIM device:

FR1 count;
FR2 count;
NR Bandwidth;
downlink throughput;
data stall rate;
average latency (per application); or Higher QCI support (dedicated or default bearer supported by the sub).

Additional parameters and inputs may be considered and selected as deemed necessary and useful. For example, additional inputs be provided by telephony if data is inexpensive for all subs and cellular data switching (e.g., switching between subs) is allowed.

Evaluating Cellular Link Metrics for All Subs (Subscriptions)

In some embodiments, location database parameters may be used to evaluate whether to switch from a wireless link currently used by an application session running on a device, e.g., by a low latency call session running on the device, to another wireless link. More specifically, a RAT manager may evaluate switching between a Wi-Fi link and a cellular link on a preferred sub directly. For example, wireless link performance indicators, e.g., obtained from a database, may be used to directly evaluate whether to switch from a Wi-Fi link to a preferred cellular link, with the cellular link accessed via a PHS link to a PHS MSIM device. The preferred cellular link may be selected from among multiple available cellular links, e.g., cellular links on a DDS sub and non-DDS sub(s), respectively.

In some embodiments, an application session, e.g., a call (e.g., a data call via a data transmission protocol) running/ executing on a device (e.g., device 626 in FIG. 6) may transition from a Wi-Fi link to a PHS link (e.g., link 620), where link 620 provides access to cellular communications to device 626 via a PHS device (e.g., UE 106 in FIG. 6, operating as a PHS for device 626). The transition from the Wi-Fi link to the PHS link may be effected when the following criteria are met:

a specific application session, e.g., a low latency call (which may be a data call), is triggered on the device to be conducted over Wi-Fi;

Wi-Fi LQM degrades and remains degraded for at least a specific duration;

cellular switching (switching between cellular subs) is enabled (e.g., by a user); and it is determined (e.g., by a RAT manager) that the session should be switched to one of the cellular subs, based on a set of criteria, e.g., based on wireless link performance indicators/parameters from a database (such as KPIs from a location DB) and dedicated bearer support.

If it is determined that the application session is to switch from Wi-Fi to a PHS link, dedicated bearer support may be evaluated on both DDS and non-DDS sub(s). If all subs meet a specified threshold required for enabling switching to PHS, the sub/carrier which will enable the dedicated bearer may be selected.

Figure 9:
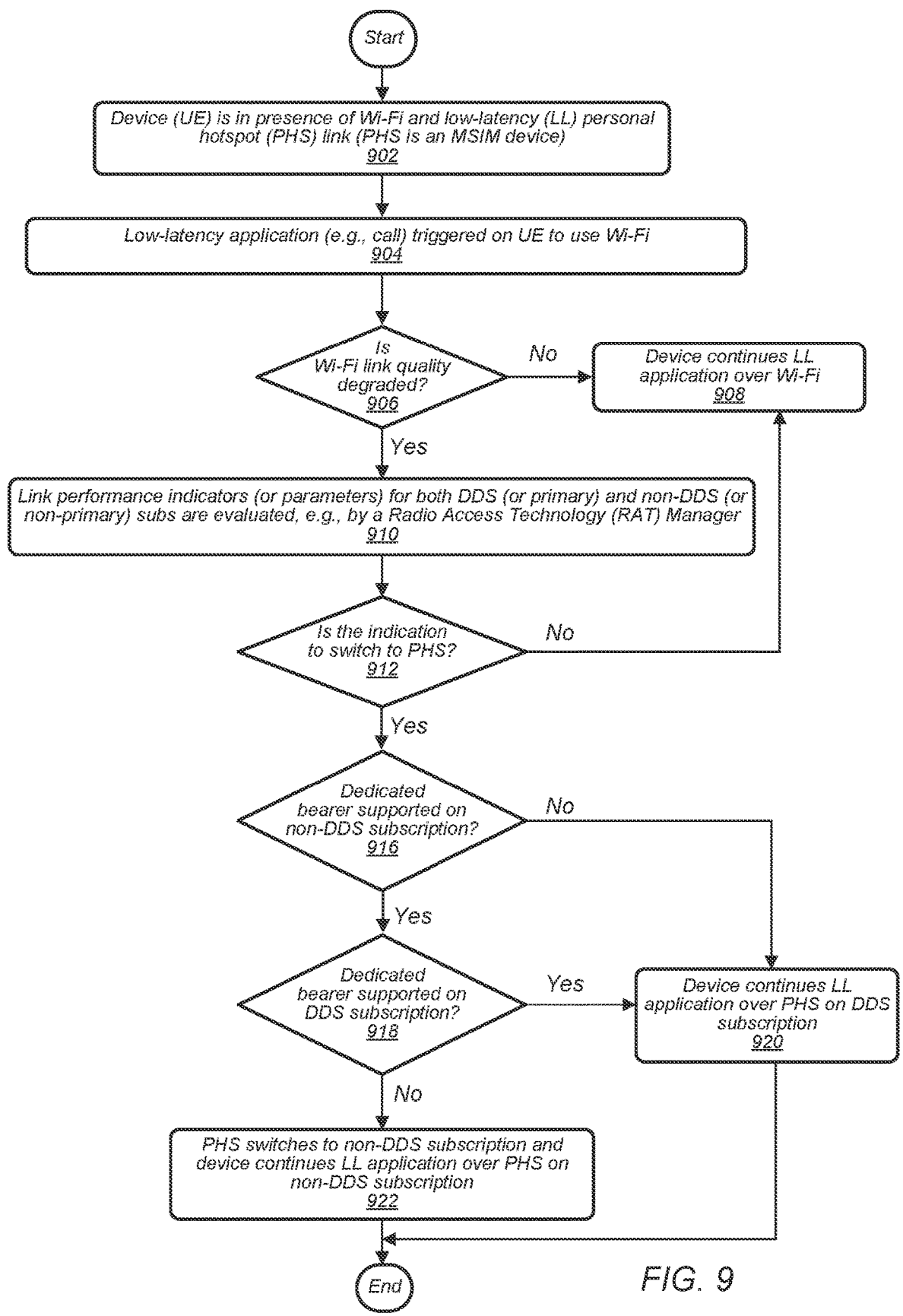
FIG. 9 shows an exemplary flow diagram illustrating a communication device switching links between different radio access technologies, according to some embodiments.

FIG. 9 shows the flow diagram of an exemplary method for a device (e.g., device 626 from FIG. 6) to switch between running/executing an application session over Wi-Fi to running/executing the application session via a PHS (e.g., UE 106 from FIG. 6). The operation of device 626 using UE 106 as a PHS has been previously described with respect to FIG. 6. At 902, the device (e.g., device 626) may be in the presence of a Wi-Fi link and also in the presence of a low-latency (LL) personal hotspot (PHS) link (e.g., link 620 to PHS device 106, which is an MSIM device in this case). At 904, an application, e.g., a low-latency application (such as a call, which may be a data call) is triggered on UE to be conducted over Wi-Fi. If the Wi-Fi link quality has not degraded, e.g., it still meets prescribed link quality requirements ("No" at 906), the device continues running/executing the application over Wi-Fi (908). However, if the Wi-Fi link quality has degraded, e.g., it no longer meets the prescribed link quality requirements ("Yes" at 906), link performance indicators (or parameters) for both DDS (or primary) and non-DDS (or non-primary) subs are evaluated, e.g., by a RAT Manager (910). As previously mentioned, in some embodiments, the link performance indicators may be obtained as parameters or parameter values from a location database. Furthermore, parameters corresponding to all subs, including primary (or DDS) and non-primary (or non-DDS) subs, may be evaluated to determine whether to switch from the Wi-Fi link to the PHS link. If the indication is not to switch to the PHS link (not to switch to communicating via the PHS; "No" at 912), the device continues running/executing the application over Wi-Fi (908). However, if the indication is to switch to the PHS link (switch to communicating via the PHS; "Yes" at 912), further or additional determinations may be made regarding which of the available subs to select for cellular communications via the PHS. In some embodiments, a RAT manager executing on the secondary device (e.g., device 626) may perform the evaluations at 910 to determine whether to switch to the PHS link. Furthermore, similar evaluations for all subs may also be performed at the PHS MSIM device (e.g., device 106) for making further/additional determinations as follows.

Once it is indicated that the secondary device is to switch to the PHS (link), at 916, it is determined whether the dedicated bearer is supported on a non-primary (or non-DDS) sub. If not ("No" at 916), the device may continue executing/running the application (session) over the PHS (via the PHS link) on the primary (or DDS) sub (920). If the bearer is supported ("Yes" at 916), it is determined at 918 whether the bearer is supported on the primary (or DDS) sub. If the bearer is supported ("Yes" at 918), the device may continue executing/running the application (session) over the PHS (via the PHS link) on the primary (or DDS) sub (920). If the bearer is not supported ("No" at 918), the PHS MSIM device switches to a non-primary (or non-DDS) sub for the cellular communications (922). It should be noted that respective RAT managers running/executing on the device and the PHS MSIM device may communicate with each other (e.g., via the PHS link). For example, the RAT manager on the device may indicate to the PHS MSIM device when the device is to switch to the PHS (at 912). Furthermore, parameter evaluations may be made for all subs by both the RAT manager in the device and the RAT manager in the PHS MSIM device.

Switching Between Two Subs on an MSIM Device During PHS session

In some embodiments, location database parameters may be used to evaluate whether to switch between different subs during an active application session, e.g., during an active call, which may be a data call. More specifically, a RAT manager on a device operating as a PHS MSIM device may evaluate switching between different cellular links corresponding to different subs, to select a a preferred sub directly. For example, wireless link performance indicators, e.g., obtained from a database, may be used to directly evaluate whether to switch from one cellular sub to another cellular sub (e.g., from a primary or DDS sub to a non-primary or non-DDS sub, and vice versa) during an active application session, e.g., during a low-latency call.

In some embodiments, a PHS session may switch from a primary or DDS sub to non-primary or non-DDS sub when the following criteria are met:

a specific application session, e.g., a low latency call, is triggered to be conducted via the PHS MSIM device;

cellular quality on current sub degrades and remains degraded for at least a specified duration;

cellular switching (switching between cellular subs) is enabled (e.g., by a user);

it is determined (e.g., by a RAT manager) that the current cellular sub should be switched to a different cellular sub, based on a set of criteria, e.g., based on wireless link performance indicators/parameters from a database (such as KPIs from a location DB) and dedicated bearer support.

The ability to switch PHS subs as described above improves device operation (and by extension the user experience) by dynamically switching between subs (e.g., between two subs) if there are data stalls or a degraded user experience due to loading, BLER or mobility.

Figure 10:
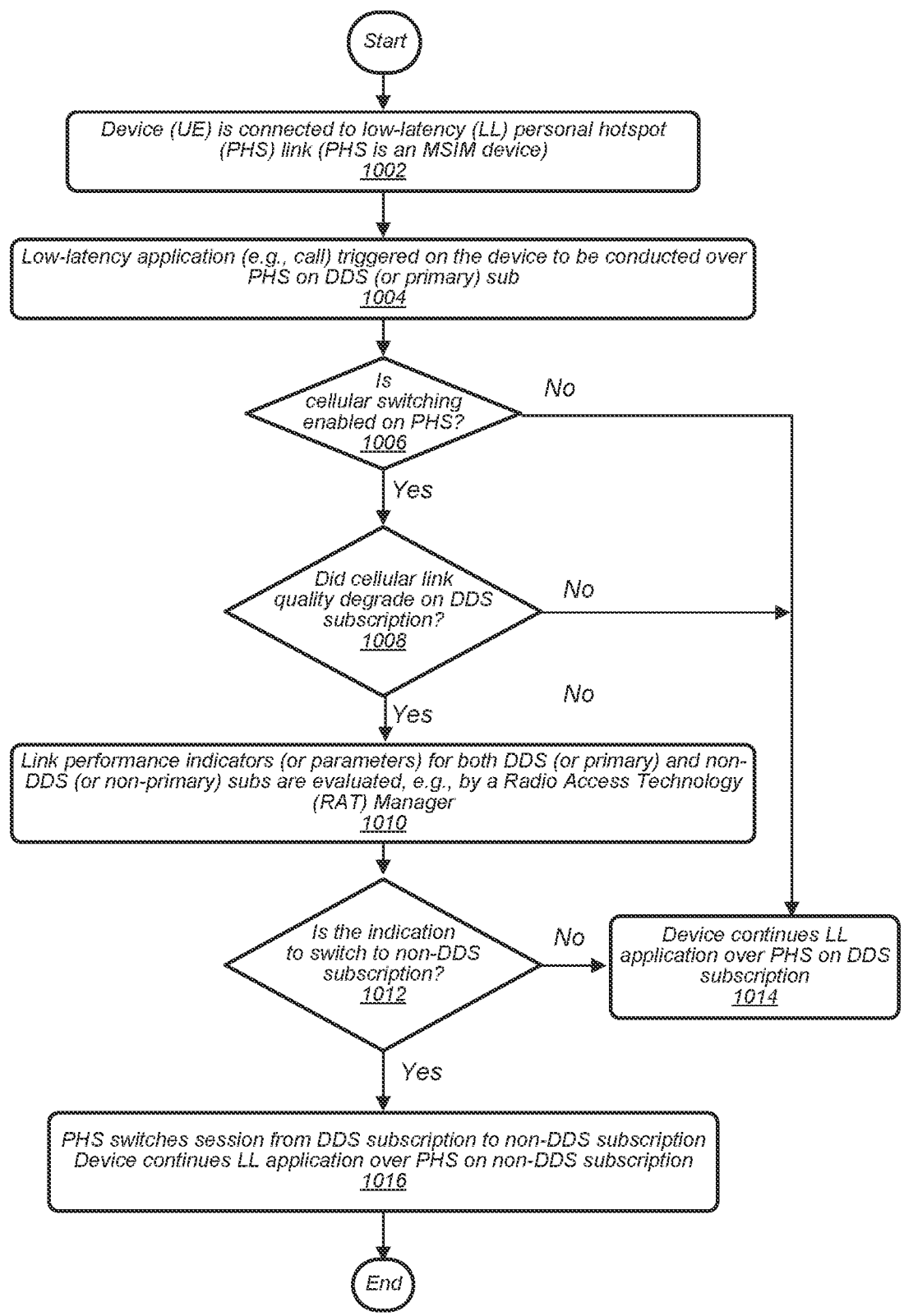
FIG. 10 shows an exemplary flow diagram illustrating a communication device operating as a personal hot spot switching links between different radio access technologies, according to some embodiments.

FIG. 10 shows the flow diagram of an exemplary method for a PHS device (e.g., device 106 in FIG. 6, in this case an MSIM device operating as a PHS) to switch between (cellular) subs during an active PHS session, e.g., during an application session executing/running on a device (e.g., on device 626 in FIG. 6) using the PHS device to conduct wireless communications for the application session. As indicated at 1002, the device (e.g., device 626) may be connected to a PHS link, that is, it may be connected to the PHS device via a low-latency link (e.g., link 620, which may be a wireless link). While connected to the PHS link, an application session (e.g., low-latency application session such as a call session) may be triggered on the device to be conducted via the PHS device on the primary sub or DDS sub of the PHS device (1004). If cellular switching is not enabled on the PHS ("No" at 1006), the device may continue executing the application over the PHS on the primary sub or DDS sub (1014).

If cellular switching is enabled on the PHS ("Yes" at 1006), it may be determined whether the cellular link quality on the primary sub or DDS sub has degraded, e.g., it no longer meets certain expected link performance requirements (1008). If the DDS sub cellular link quality has not degraded ("No" at 1008), the device may continue executing the application over the PHS on the primary sub or DDS sub (1014). If, on the other hand, the DDS sub cellular link quality has degraded, e.g., remaining degraded for a specified time period ("Yes" at 1008), the link performance indicators (or parameters) for both DDS (or primary) and non-DDS (or non-primary) subs are evaluated, e.g., by a RAT Manager (1010), and a determination is made based on that evaluation whether to switch to a non-primary or non-DDS sub (1012). If the indication is not to switch ("No" at 1012), the device may continue executing the application over the PHS on the primary sub or DDS sub (1014). If the indication is to switch ("Yes" at 1012), the PHS device may switch the PHS session from the primary sub or DDS sub to a non-primary or non-DDS sub, and the device may continue executing the application over the PHS on the non-primary sub or non-DDS sub (1016).

By evaluating link performance indicators/parameters for cellular links corresponding to all subs, including primary/DDS and non-primary/non-DDS subs, and dynamically switching between different cellular sub links based on that evaluation, device performance and by extension user experience may be improved for devices running/executing various applications, e.g., low-latency applications, by always identifying and selecting the most preferred of links, including Wi-Fi links and cellular links, available to a device, including cellular links available to a device via an MSIM device used as a PHS by the device. Accordingly, the best available cellular sub link may be selected at a PHS when a device executing an application session over Wi-Fi switches to executing the application session over the PHS via a PHS link to the PHS, as illustrated in FIG. 9. Furthermore, a PHS session does not need to use the same cellular sub link for its cellular communications during an application session, and may switch to the best available cellular sub link at any given time, as illustrated in FIG. 10.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A device comprising:
a processor configured to:
make a determination of a link quality of a Wi-Fi link, wherein the Wi-Fi link is being used by the device for an application session executing on the device;
perform an evaluation of link performance of a plurality of cellular links corresponding to respective cellular subscriptions used by a second device;
cause the device to switch to using a second link established between the device and the second device to access a selected cellular link of the plurality of cellular links for use by the device via the second device for the application session, based on the determination indicating that the link quality of the Wi-Fi link does not satisfy a set of link performance requirements and the evaluation indicating that the device should switch from using the Wi-Fi link to using the second link.

2. The device of claim 1, wherein the processor is further configured to cause the device to continue using the Wi-Fi link in response to one of:
the determination indicating that the Wi-Fi link satisfies the set of link performance requirements; or
the determination indicating that the Wi-Fi link does not satisfy the set of link performance requirements and the evaluation indicating that the device should not switch from using the Wi-Fi link to using the second link.

3. The device of claim 1, wherein the device is a wearable device and the second device is a personal hotspot device.

4. The device of claim 1, wherein the selected cellular link is determined based at least on the link quality of the plurality of cellular links.

5. The device of claim 1, wherein the processor is further configured to:
obtain parameters corresponding to the plurality of cellular links for each respective cellular subscription from a location database; and
perform the evaluation using the parameters.

6. The device of claim 1, wherein a first subscription of the respective cellular subscriptions is a primary subscription and remaining subscriptions of the respective cellular subscriptions are non-primary subscriptions.

7. The device of claim 6, wherein the selected cellular link is determined based at least on whether a dedicated bearer is supported on any of the non-primary subscriptions.

8. The device of claim 7, wherein the selected cellular link is determined further based on whether the dedicated bearer is supported on the primary subscription, when the dedicated bearer is supported on at least one of the non-primary subscriptions.

9. The device of claim 8, wherein the selected cellular link corresponds to the primary subscription when the dedicated bearer is supported on the primary subscription; and
wherein the selected cellular link corresponds to a non-primary subscription when the dedicated bearer is supported on the non-primary subscription and is not supported on the primary subscription.

10. A method for efficient communications using a personal hotspot (PHS) device, the method comprising:
executing an application on a device, comprising using a Wi-Fi link for the application;
making a determination of a link quality of the Wi-Fi link;
performing an evaluation of link performance of a plurality of cellular links corresponding to respective cellular subscriptions used by the PHS device;
switching to using a second link established between the device and the PHS device to access an active cellular link of the plurality of cellular links for use by the device via the PHS device for the application, based on the determination indicating that the link quality of the Wi-Fi link does not satisfy a set of link performance requirements and the evaluation indicating that the device should switch from using the Wi-Fi link to using the second link.

11. The method of claim 10, further comprising:
continuing to use the Wi-Fi link in response to one of:
the determination indicating that the Wi-Fi link satisfies the set of link performance requirements; or
the determination indicating that the Wi-Fi link does not satisfy the set of link performance requirements and the evaluation indicating that the device should not switch from using the Wi-Fi link to using the second link.

12. The method of claim 10, further comprising:
determining the active cellular link based at least on the link quality of the plurality of cellular links.

13. The method of claim 12, wherein determining the active cellular link is based further on which cellular links of the plurality of cellular links support a dedicated bearer.

14. The method of claim 10, wherein performing the evaluation comprises:
obtaining parameters corresponding to the plurality of cellular links for each respective cellular subscription from a location database; and
performing the evaluation based on the parameters.

15. The method of claim 10, further comprising:
making a determination whether to switch to a second cellular link of the plurality of cellular links to become the active cellular link on the PHS device during execution of the application on the device; and
switching to the second cellular link to become the active cellular link in response to the determination indicating that the second cellular link should be the active cellular link;
wherein the determination is based at least on the link performance of the plurality of cellular links.

* * * * *